(12) United States Patent
Kim et al.

(10) Patent No.: US 8,715,539 B2
(45) Date of Patent: May 6, 2014

(54) POSITIVE ELECTRODE MATERIAL FOR LITHIUM SECONDARY BATTERY AND METHOD FOR MANUFACTURING THE SAME

(75) Inventors: Sa Heum Kim, Gwacheon (KR); Seung Ho Ahn, Seoul (KR); Dong Gun Kim, Seoul (KR); Young Jun Kim, Gyeonggi-Do (KR); Jun Ho Song, Seongnam (KR)

(73) Assignees: Hyundai Motor Company, Seoul (KR); Korea Electronics Technology Institute, Seongnam, Gyeonggi-Do (KR)

( * ) Notice: Subject to any disclaimer, the term of this patent is extended or adjusted under 35 U.S.C. 154(b) by 432 days.

(21) Appl. No.: 12/925,649

(22) Filed: Oct. 25, 2010

(65) Prior Publication Data

US 2012/0012798 A1    Jan. 19, 2012

(30) Foreign Application Priority Data

Jul. 15, 2010   (KR) .................... 10-2010-0068436

(51) Int. Cl.
*H01M 4/13* (2010.01)
*H01M 4/58* (2010.01)
*H01M 4/50* (2010.01)
*H01M 4/04* (2006.01)
*H01M 4/131* (2010.01)
*H01M 4/62* (2006.01)

(52) U.S. Cl.
USPC .............. 252/521.2; 252/500; 252/521.5; 429/208; 429/218.1; 429/224; 429/231.95; 429/232

(58) Field of Classification Search
USPC ......... 252/500, 521.2, 521.5; 429/208, 218.1, 429/224, 231.95, 232; 423/306
See application file for complete search history.

(56) References Cited

U.S. PATENT DOCUMENTS 6,962,666 B2 * 11/2005 Ravet et al. ................... 252/506

FOREIGN PATENT DOCUMENTS

| CN | 1099316 C | * | 1/2003 |
| JP | 11025983 A | | 1/1999 |
| KR | 20060108110 | * | 10/2006 |
| KR | 10-2008-0047537 | | 5/2008 |
| KR | 10-2009-0047301 | | 5/2009 |
| WO | WO-2007034823 A1 | | 3/2007 |

* cited by examiner

*Primary Examiner* — Harold Pyon
*Assistant Examiner* — Tanisha Diggs
(74) *Attorney, Agent, or Firm* — Edwards Wildman Palmer LLP; Peter F. Corless; Kongsik Kim

(57) ABSTRACT

The present invention provides a positive electrode material for a lithium secondary battery comprising a compound represented by the following Formula 1:

$$LiMn_{1-x}M_xP_{1-y}As_yO_4 \qquad \text{[Formula 1]}$$

wherein $0 < x \leq 0.1$, $0 < y \leq 0.1$, and M is at least one metal selected from the group consisting of magnesium (Mg), titanium (Ti), nickel (Ni), cobalt (Co), and iron (Fe). Positive electrode materials of the present invention, when used as a positive electrode material in a lithium secondary battery, provides increased discharge potential of the battery due to its high discharge capacity, excellent cycle characteristics and charge/discharge efficiency, and high discharge potential with respect to lithium.

10 Claims, 4 Drawing Sheets
(3 of 4 Drawing Sheet(s) Filed in Color)

POSITIVE ELECTRODE MATERIAL FOR LITHIUM SECONDARY BATTERY AND METHOD FOR MANUFACTURING THE SAME

CROSS-REFERENCE TO RELATED APPLICATION

This application claims under 35 U.S.C. §119(a) the benefit of Korean Patent Application No. 10-2010-0068436 filed Jul. 15, 2010, the entire contents of which are incorporated herein by reference.

BACKGROUND (a) Technical Field

The present invention relates to a positive electrode material for a lithium secondary battery and a method for manufacturing the same.

(b) Background Art

With the proliferation of portable electric and electronic devices, the development of improved secondary batteries, such as a nickel hydrogen batteries and lithium secondary batteries, has been actively pursued. In lithium secondary batteries, carbon, such as graphite, is used as a negative electrode active material, an oxide containing lithium is used as a positive electrode active material, and a non-aqueous solvent is used as an electrolyte. Because lithium is a metal which is readily ionized, it is capable of generating high voltages. As such, much work has been focused towards developing lithium secondary batteries having high energy density.

As a positive electrode active material, lithium transition metal oxides containing lithium are widely used in lithium secondary batteries. It is estimated that more than 90% of lithium secondary batteries use layered lithium transition metal oxides, such as lithium cobalt oxide, lithium nickel oxide, and multi-component (cobalt-nickel-manganese ternary system) metal oxide, as positive electrode active materials.

However, when layered lithium transition metal oxides are used as a positive electrode active material, oxygen separates from the lattice structure and undergoes reaction in an abnormal state (such as overcharge and high temperature), thus causing defects such as battery fire. In attempt to address the drawbacks of the layered lithium transition metal oxides, extensive research has been aimed at developing a positive electrode active material having spinel and olivine structures.

In particular, in one method, the use of an olivine lithium metal phosphate as a positive electrode material, instead of the layered lithium transition metal oxide has been proposed. Olivine lithium metal phosphates contain phosphorus as well as oxygen in its main frame which supports its structure, and thus has increased stability as compared to layered oxides. Accordingly, when olivine lithium metal phosphates are used as a positive electrode material, it is possible to provide improved stability.

One such phosphate, lithium iron phosphate ($LiFePO_4$) prepared by coating the surface with 1 to 2 wt % carbon, can provide a capacity of more than 150 $mAhg^{-1}$, and thus has recently been used in the field of batteries where high safety is required. However, this lithium iron phosphate has a low discharge potential of 3.5 V with respect to lithium, and thus, when it is used in the positive electrode, the discharge potential of the lithium secondary battery is reduced, thereby reducing the energy density of the battery.

In an attempt to address the problem of low energy density due to low discharge potential, International Patent Publication No. WO 2007 034823 and Korean Patent Application Publication No. 10-2008-0047537 describes lithium manganese phosphates having a higher potential. Since the discharge voltage of the lithium manganese phosphate is 4.0 V or higher, it is possible to address the problem of low discharge potential of the lithium iron phosphate. However, the conductivity of lithium manganese phosphates is very low, and thus it is difficult to provide high capacity using material, and the rate capability is significantly reduced.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a positive electrode material for use in a lithium secondary battery, which increases the discharge potential of the battery due to the material's high discharge capacity, excellent cycle characteristics and charge/discharge efficiency, and high discharge potential with respect to lithium. The present invention further provides a method for fabricating a positive electrode material for a lithium ion battery, and lithium ion batteries containing the present positive electrode material.

In one aspect, the present invention provides a positive electrode material for a lithium secondary battery comprising a compound represented by the following formula 1:

$$LiMn_{1-x}M_xP_{1-y}As_yO_4 \qquad \text{[Formula 1]}$$

wherein 0<x≤0.1, 0<y≤0.1, and M is at least one metal selected from magnesium (Mg), titanium (Ti), nickel (Ni), cobalt (Co), and iron (Fe).

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The file of this patent contains at least one drawing executed in color. Copies of this patent with color drawings will be provided by the Patent and Trademark Office upon request and payment of the necessary fee.

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
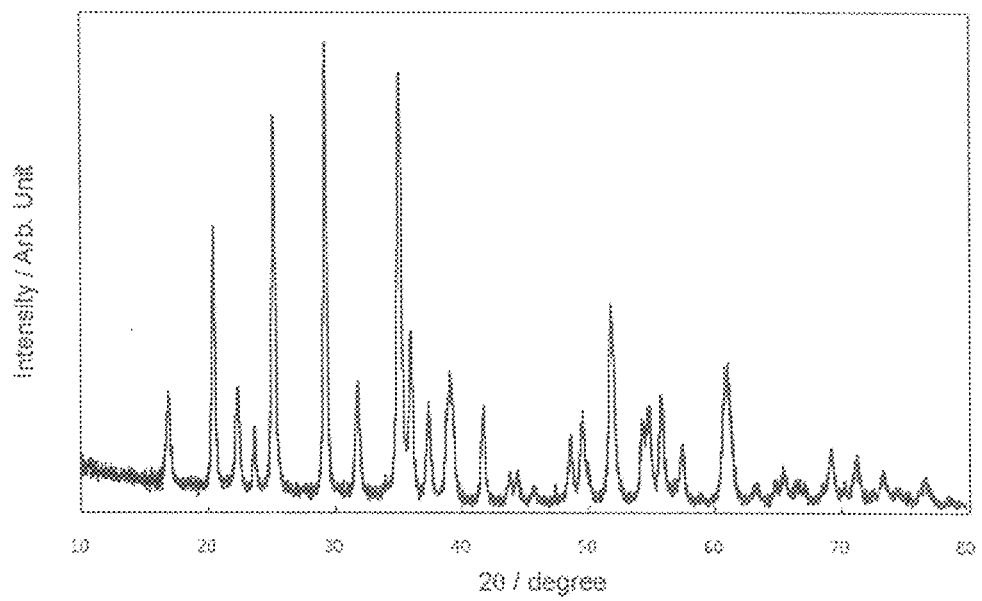
FIG. 1 is an x-ray diffraction (XRD) graph of a lithium manganese phosphate positive electrode material for a lithium secondary battery prepared according to Example 1 of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

The present invention provides a positive electrode material for a lithium secondary battery containing a compound represented by the following Formula 1.

$$LiMn_{1-x}M_xP_{1-y}As_yO_4 \qquad \text{[Formula 1]}$$

wherein $0<x\le0.1$, $0<y\le0.1$, and M is at least one metal selected from the group consisting of magnesium (Mg), titanium (Ti), nickel (Ni), cobalt (Co), and iron (Fe).

In the positive electrode material, the molar ratio of M to the manganese site (Mn+M), that is, x in Formula 1 is preferably 0.1 or less. It has been found that when the molar ratio exceeds 0.1, the content of manganese as an electrochemically active species is reduced, and thus the initial discharge capacity is reduced. Preferably the molar ratio of arsenic (As) to the phosphorus site (P+As), that is, y in Formula 1, is 0.1 or less. It has been found that when the molar ratio exceeds 0.1, a structural modification occurs, and thus the electrochemical activity may be lost.

In an exemplary embodiment, in the positive electrode material, $0.01\le x\le0.02$, $0.01\le y\le0.02$, and M is Mg.

The present invention further provides methods for manufacturing a positive electrode material for a lithium secondary battery. Such methods are not particularly limited.

In one preferred embodiment, the positive electrode material for the lithium secondary battery according to the present invention is manufactured by a method including: feeding a lithium oxide or a precursor thereof (i.e., a compound of a metal or a metal group that is converted into an oxide when heated), a manganese oxide or a precursor thereof, a phosphate or a precursor thereof, a chelating agent, and water into a hydrothermal synthesis apparatus to react with each other; adding a Mg, Ti, Co, Ni, or Fe substituent and an arsenic substituent; and washing and drying the reaction solution.

It is preferred that the above-described raw materials be properly mixed together based on the composition ratio of the compound represented by Formula 1.

In certain embodiments, method may further include: uniformly mixing the reaction solution with a carbon conductive material after washing and drying the reaction solution; and post-heat treating the resulting solution at a temperature of 200 to 500° C.

The precursor of the lithium oxide may include any known lithium oxide precursors such as, but not limited to, lithium phosphate, lithium carbonate, lithium hydroxide, lithium acetate, lithium sulfate, lithium sulfite, lithium fluoride, lithium chloride, lithium bromide, lithium iodide, and mixtures thereof.

The precursor of the manganese oxide may include any known manganese oxide precursors such as, but not limited to, manganese metal, manganese oxide, manganese oxalate, manganese acetate, manganese nitrate, and mixtures thereof.

The precursor of the phosphate may include any known phosphate precursors such as, but not limited to, lithium phosphate, sodium phosphate, potassium phosphate, and mixtures thereof.

The Mg, Ti, Co, Ni or Fe substituent may include any known substituents such as, but not limited to, magnesium acetate, titanium tetrachloride, cobalt sulfate, nickel nitrate, and iron acetate.

The arsenic substituent may include any known arsenic substituents such as, but not limited to, ammonium arsenate, arsenic trioxide, and mixtures thereof.

The chelating agent may include any known chelating agents such as, but not limited to, diethylene glycol (DEG), oxalic acid, acetic acid, and mixtures thereof. The chelating agent reacts with ions to maintain a uniformly mixed state and inhibit particle growth during reaction.

The present invention further provides a lithium secondary battery which includes the compound represented by formula 1. The lithium secondary battery can be manufactured in accordance with any conventional methods for manufacturing lithium secondary batteries, except that the positive electrode material of the present invention is used.

Next, the manufacturing of a positive electrode plate and the configuration of the lithium secondary battery will be briefly described. However, such manufacturing and configuration is only in accordance with certain exemplary embodiments, and it is understood that the present invention is not limited thereto.

In an exemplary embodiment, during the manufacturing of the positive electrode plate, the powder of the positive electrode material of the present invention may further contain one or more additive selected from any conventional additives such as a conductive material, a binder, a filler, a dispersant, an ion conductive material, and a pressure increasing agent, and an appropriate solvent (e.g., organic solvent) may further be added such that the resulting mixture is in the form of slurry or paste. The thus obtained slurry or paste is applied to an electrode support substrate, for example by using doctor blade, and then is dried and pressed, such as by a roll press, thereby forming the positive electrode plate.

Examples of suitable conductive materials may include, but are not limited to, graphite, carbon black, acetylene black, ketjen black, carbon fiber, metal powder, etc. Examples of suitable binders may include, but are not limited to, polyvinylidene fluoride (PVdF), polyethylene, etc. As an electrode support substrate (also called a current collector), any of those conventionally used may suitably be used in the present invention. Such electrode support substrates, may for example, in the form of a film or sheet made of silver, copper, nickel, stainless steel, aluminum, etc., or may be in the form of carbon fibers.

In an exemplary embodiment, a lithium secondary battery of the present invention is manufactured using the positive electrode of the invention formed in the above-described manner. The lithium secondary battery may have any conventional shape such as coin, button, sheet, cylinder, and prism. The lithium secondary battery of the present invention may include a negative electrode, an electrolyte, a separator, etc., which can be in accordance with any conventional lithium secondary batteries.

For example, in certain embodiments the negative electrode active material may include at least one material selected from the group consisting of carbon materials such as graphite and a complex oxide of a transition metal. Other conventional materials, such as, silicon, tin, etc. may also suitably be used as the negative electrode active material.

In exemplary embodiments, the electrolyte may include, but is not limited to, a non-aqueous electrolyte prepared by dissolving a lithium salt in an organic solvent, an inorganic solid electrolyte, and a complex of an inorganic solid electrolyte. The solvent of the non-aqueous electrolyte may include any conventional solvents such as, for example, at least one selected from the group consisting of esters such as ethylene carbonate, propylene carbonate, dimethyl carbonate, diethyl carbonate, methyl ethyl carbonate, etc.; lactones such as butyl lactone, etc.; ethers such as 1,2-dimethoxyethane, ethoxymethoxy ethanol, etc.; and nitriles such as acetonitrile, etc. As the lithium salt of the non-aqueous electrolyte, any conventionally used are suitable, and may include, but are not limited to, lithium hexafluoroarsenate (LiAsF$_6$), lithium tetrafluoroborate (LiBF$_4$), lithium hexafluorophosphate (LiPF$_6$), etc.

In an exemplary embodiment, the separator may be formed of a porous material such as porous film, non-woven fabric, etc., prepared from a polyolefin such as polypropylene (PP) and/or polyethylene (PE).

Lithium secondary batteries according to the present invention provide numerous benefits, and demonstrate an excellent discharge capacity and a high average discharge voltage.

Next, the present invention will be described in detail with reference to examples. However, the scope of the present invention is not limited to the following examples.

Example 1

30 mL of 0.06 M manganese acetate solution [Mn(CH$_3$COO)$_2$, 98%] and 250 mL of diethylene glycol (DEG) as a chelating agent were added to 30 mL of 0.06 M lithium phosphate solution (LiH$_2$PO$_4$, 98.5%) and the resulting solution was fed into a hydrothermal synthesis apparatus to react with each other at a temperature of about 180° C. for 5 hours. Thereafter, 0.3 mL of 0.06 M magnesium solution acetate [Mg(CH$_3$COO)$_2$, 98%] and 0.3 mL of 0.06 M ammonium arsenate solution [(NH$_4$)H$_2$AsO$_4$, 98%] as substituents were added to the hydrothermal synthesis apparatus, thus obtaining a light pink powder suspension. The powder suspension was washed and dried and the resulting material was uniformly mixed with Super-P carbon black at a ratio of 80:20 using a ball mill, and the mixture was heat-treated to prepare a positive electrode material.

The analysis of metals in the prepared positive electrode material was performed by fluorescence X-ray analysis with respect to metals other than lithium (Li) and by inductively coupled plasma (ICP) emission spectroscopy analysis with respect to Li. The analysis results are shown in the following Table 1.

FIG. 1 is an x-ray diffraction (XRD) graph of the phosphate positive electrode material prepared in Example 1 of the present invention.

Figure 2:
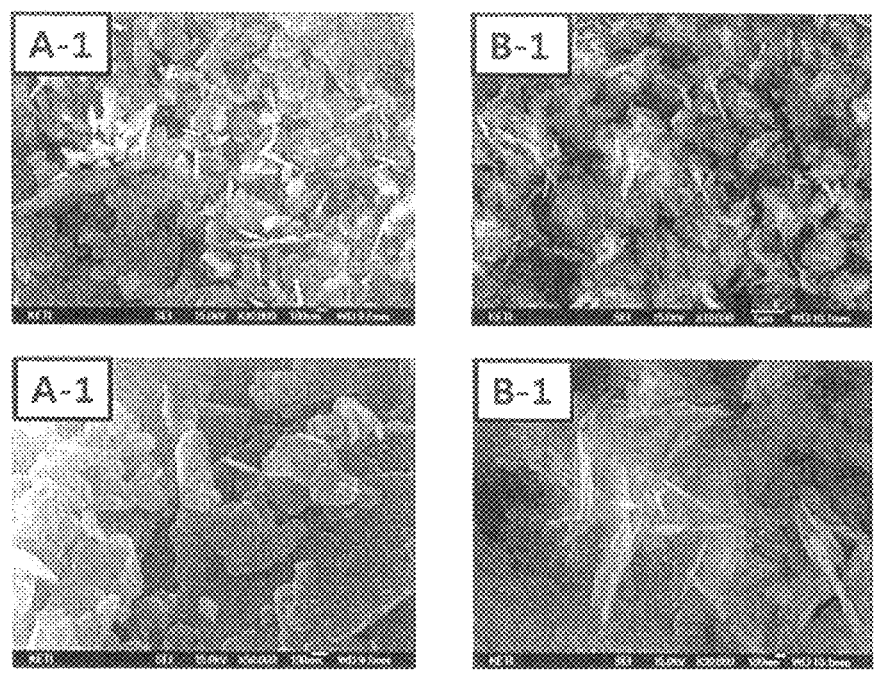
FIG. 2 shows electron microscope images of positive electrode materials prepared by hydrothermal synthesis in Example 1 and Comparative Example 1.

Moreover, FIG. 2 shows electron microscope images of the positive electrode materials prepared in Example 1 and prepared in the following Comparative Example 1, respectively. The positive electrode material should have a uniform shape and an average particle size of 20 nm to exhibit excellent electrochemical performance. However, as shown in FIG. 2, the particle size of the positive electrode material of Comparative Example 1 was significantly larger than that of Example 1, and thus the positive electrode material of Comparative Example 1 had no significant effect on the electrochemical performance. It can be seen that, the As ions have an ionic radius larger than that of P ions, and thus, when As is substituted, the lattice constant of the material is increased, which facilitates the intercalation of lithium ions into the material, thereby increasing the output and capacity.

Example 2

A positive electrode material was prepared in the same manner as Example 1, except that 0.45 mL of 0.06 M magnesium acetate solution [Mg(CH$_3$COO)$_2$, 98%] and 0.45 mL of 0.06 M ammonium arsenate solution [(NH$_4$)H$_2$AsO$_4$, 98%] were used. The analysis of metals in the prepared positive electrode material was performed by fluorescence X-ray analysis with respect to metals other than Li and by ICP emission spectroscopy analysis with respect to Li. The analysis results are shown in the following Table 1.

Example 3

A positive electrode material was prepared in the same manner as Example 1, except that 0.6 mL of 0.06 M magnesium acetate solution [Mg(CH$_3$COO)$_2$, 98%] and 0.6 mL of 0.06 M ammonium arsenate solution [(NH$_4$)H$_2$AsO$_4$, 98%] were used. The analysis of metals in the prepared positive electrode material was performed by fluorescence X-ray analysis with respect to metals other than Li and by ICP emission spectroscopy analysis with respect to Li. The analysis results are shown in the following Table 1.

Comparative Example 1

A positive electrode material was prepared in the same manner as Example 1, except that the magnesium acetate and ammonium arsenate were not used. The analysis of metals in the prepared positive electrode material was performed by fluorescence X-ray analysis with respect to metals other than Li and by ICP emission spectroscopy analysis with respect to Li. The analysis results are shown in the following Table 1.

Comparative Example 2

A positive electrode material was prepared in the same manner as Example 1, except that 0.3 mL of 0.06 M magnesium acetate solution [Mg(CH$_3$COO)$_2$, 98%] was used and the ammonium arsenate solution was not used. The analysis of metals in the prepared positive electrode material was performed by fluorescence X-ray analysis with respect to metals other than Li and by ICP emission spectroscopy analysis with respect to Li. The analysis results are shown in the following Table 1.

Test Example

Evaluation of Electrode Performance

The powders of the positive electrode materials in Examples 1 to 3 and Comparative Examples 1 and 2 were sieved to an average particle diameter of 5 µm. Slurries using each powder were prepared using 95 wt % positive electrode active material, 5 wt % polyvinylidene fluoride (PVdF) as a binder, and N-methylpyrrolidone (NMP) as a solvent. The slurries were coated on aluminum foil having a thickness of about 20 µm, and dried and pressed by a roll press. The resulting foils were then dried under vacuum at a temperature of 120° C. for 16 hours to prepare disk-shaped electrodes having a diameter of 16 mm.

A punched lithium metal foil having a diameter of 16 mm was used as a counter electrode and a polypropylene (PP) film was used as a separator. A 1 M mixed solution of $LiPF_6$ and ethylene carbonate/dimethoxyethane (EC/DME) (1:1, v/v) was used as an electrolyte. After the separator was immersed in the electrolyte, the resulting separator was inserted between the working electrode and the counter electrode to evaluate the electrode performance using a stainless steel housing as a test cell for the evaluation.

TABLE 11

| | Analysis results (molar ratio) | | | | | Discharge capacity at room temperature [mAhg$^{-1}$] | Discharge voltage (V) |
|---|---|---|---|---|---|---|---|
| | Li | Mn | PO$_4$ | Mg | As | | |
| Example 1 | 1.0 | 1.0 | 1.0 | 0.010 | 0.010 | 135 | 3.90 |
| Example 2 | 1.0 | 1.0 | 1.0 | 0.015 | 0.015 | 140 | 3.91 |
| Example 3 | 1.0 | 1.0 | 1.0 | 0.020 | 0.020 | 121 | 3.75 |
| Comparative Example 1 | 1.0 | 1.0 | 1.0 | — | — | 121 | 3.75 |
| Comparative Example 2 | 1.0 | 1.0 | 1.0 | 0.010 | — | 132 | 3.80 |
| Comparative Example 3 | 1.0 | 1.0 | 1.0 | 0.015 | — | 135 | 3.84 |

Figure 3:
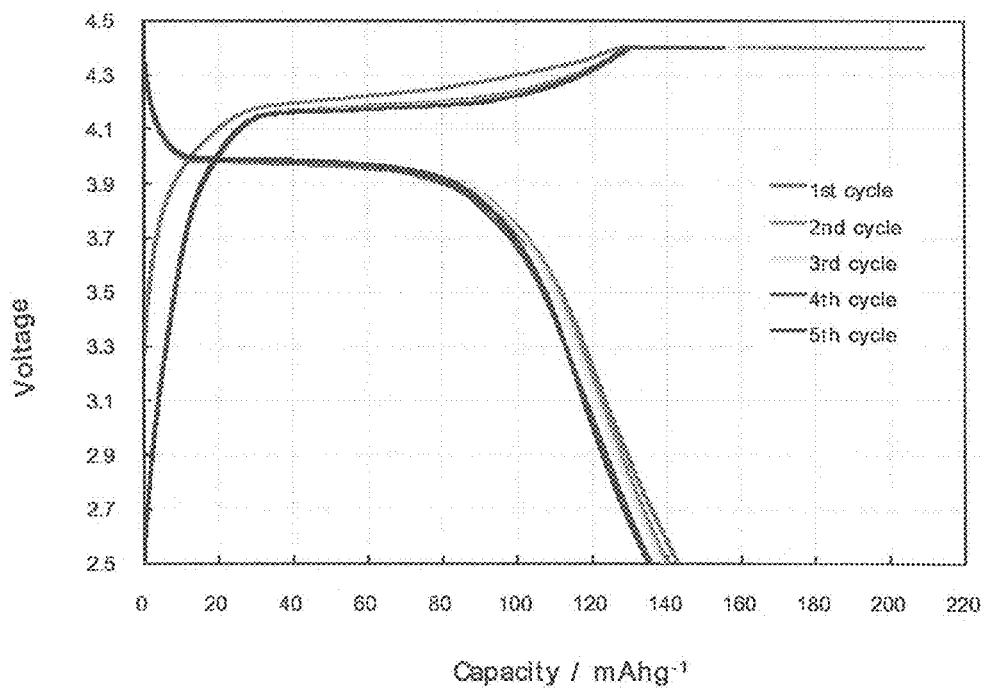
FIG. 3 shows charge/discharge curves obtained at room temperature, for the positive electrode material prepared in Example 1.
Figure 4:
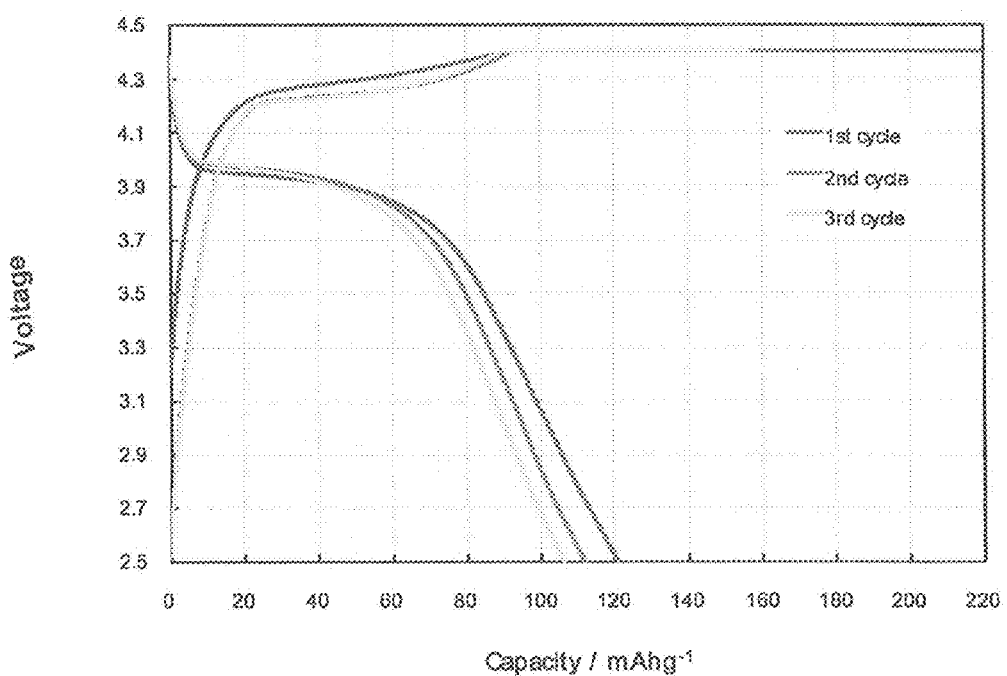
FIG. 4 shows charge/discharge curves obtained at room temperature, for the positive electrode material prepared in Comparative Example 1.

As shown in FIGS. 3 and 4, the charge/discharge curves, measured at room temperature, of the positive electrode materials prepared according to Example 1 and Comparative Example 1 were compared. The vertical axis represents voltage wherein a relative voltage is plotted based on criterion that the voltage when lithium becomes lithium ion is zero ('0'). It can be seen that the capacity corresponding to the flat region with an average discharge voltage of 3.9 V or higher in Example 1 is greater than that of Comparative Example 1. Thus it is possible to obtain a higher energy density when the positive electrode material of Example 1 is used in a battery. Moreover, because the charge/discharge efficiency during cycling is higher in Example 1 than in Comparative Example 1, it is possible to efficiently store and use energy using the material of Example 1.

Figure 5:
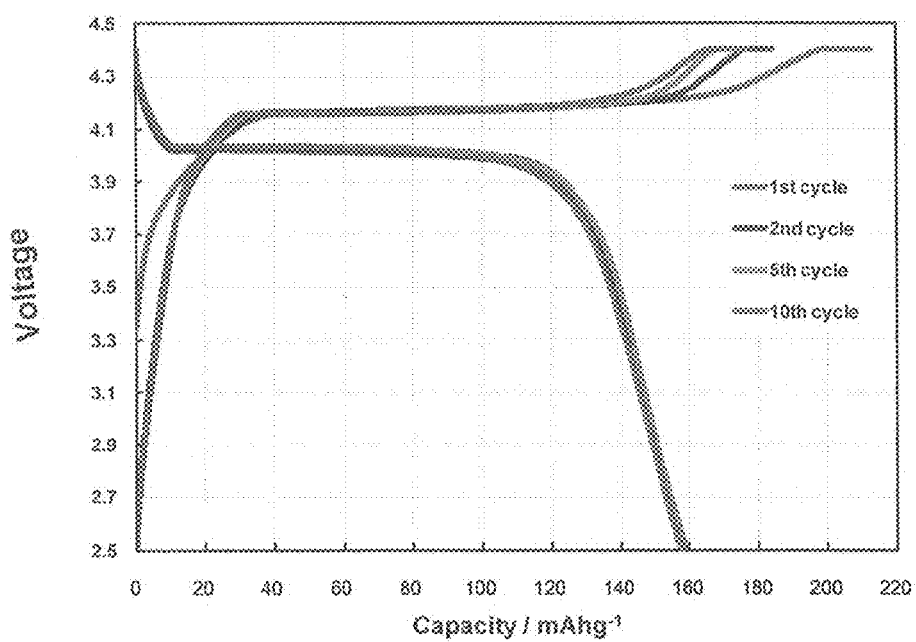
FIG. 5 shows charge/discharge curves obtained at 60° C., for the positive electrode material prepared in Example 1.

FIG. 5 shows charge/discharge curves, measured at a temperature of 60° C., of the positive electrode material prepared in Example 1. It can be seen that the positive electrode material of Example 1 exhibits a reversible capacity of 160 mAhg$^{-1}$ even at a high temperature of 60° C., which is close to the theoretical capacity.

As described and demonstrated above, when the positive electrode material of the present invention is used in the positive electrode of the lithium secondary battery, the discharge potential of the battery is increased due to its high discharge capacity, excellent cycle characteristics and charge/discharge efficiency are provided, and high discharge potential with respect to lithium is provided.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A positive electrode material for a lithium secondary battery comprising a compound represented by the following formula 1:

$$LiMn_{1-x}M_xP_{1-y}As_yO_4 \quad \text{[Formula 1]}$$

wherein $0<x\leq0.1$, $0<y\leq0.1$, and M is at least one metal selected from the group consisting of magnesium (Mg), titanium (Ti), nickel (Ni), cobalt (Co), and iron (Fe).

2. The positive electrode material of claim 1, wherein $0.01\leq x\leq0.02$, $0.01\leq y\leq0.02$, and M is Mg.

3. A method for manufacturing a positive electrode material of claim 1 for a lithium secondary battery, the method comprising:
    feeding a lithium oxide or a precursor thereof, a manganese oxide or a precursor thereof, a phosphate or a precursor thereof, a chelating agent, and water into a hydrothermal synthesis apparatus to react with each other;
    adding a Mg, Ti, Co, Ni, or Fe substituent and an arsenic substituent; and
    washing and drying the reaction solution.

4. The method of claim 3, further comprising:
    uniformly mixing the reaction solution with a carbon conductive material after washing and drying the reaction solution; and
    post-heat treating the resulting solution at a temperature of 200 to 500° C.

5. The method of claim 3, wherein the precursor of the lithium oxide is lithium phosphate, lithium carbonate, lithium hydroxide, lithium acetate, lithium sulfate, lithium sulfite, lithium fluoride, lithium chloride, lithium bromide, lithium iodide, or a mixture thereof.

6. The method of claim 3, wherein the precursor of the manganese oxide is manganese metal, manganese oxide, manganese oxalate, manganese acetate, manganese nitrate, or a mixture thereof.

7. The method of claim 3, wherein the precursor of the phosphorus is lithium phosphate, sodium phosphate, potassium phosphate, or a mixture thereof.

8. The method of claim 3, wherein the Mg, Ti, Co, Ni or Fe substituent is magnesium acetate, titanium tetrachloride, cobalt sulfate, nickel nitrate, or iron acetate.

9. The method of claim 3, wherein the arsenic substituent is ammonium arsenate, arsenic trioxide, or a mixture thereof.

10. A lithium secondary battery comprising the positive electrode material of claim 1.

* * * * *